United States Patent

[11] 3,630,422

[72] Inventors George F. Krtous
Chicago;
Edward G. Thurston, Urbana, both of Ill.
[21] Appl. No. 2,759
[22] Filed Jan. 14, 1970
[45] Patented Dec. 28, 1971
[73] Assignee Bell & Howell Company
Chicago, Ill.

[54] INTERMITTENT FILM MOTION MECHANISM
11 Claims, 5 Drawing Figs.
[52] U.S. Cl. .................................................. 226/62,
352/195, 352/196
[51] Int. Cl. .................................................. G03b 1/22
[50] Field of Search .......................................... 226/62,
70–72; 352/194, 195, 196

[56] References Cited
UNITED STATES PATENTS
2,587,548 2/1952 Thevenaz .................... 226/71
3,441,186 4/1969 Good ........................... 226/62

Primary Examiner—Richard A. Schacher
Attorneys—William F. Pinsak and William K. Serp ABSTRACT: An intermittent film motion mechanism having a shuttle with first and second cam followers on the shuttle, a film engaging member fixed to the shuttle, a cam engageable with the shuttle through the first and second cam followers, resilient means to continuously urge the shuttle against the cam, and a pivot pin for the shuttle located between the cam followers and the film engaging member. The cam has an outer cam surface with which the first cam follower is engaged, and a groove located interiorly of the outer cam surface, the groove having an inner cam surface with which said second cam follower is engaged, and the inner cam surface having a contour differing from said outer cam surface.

Patented Dec. 28, 1971 3,630,422
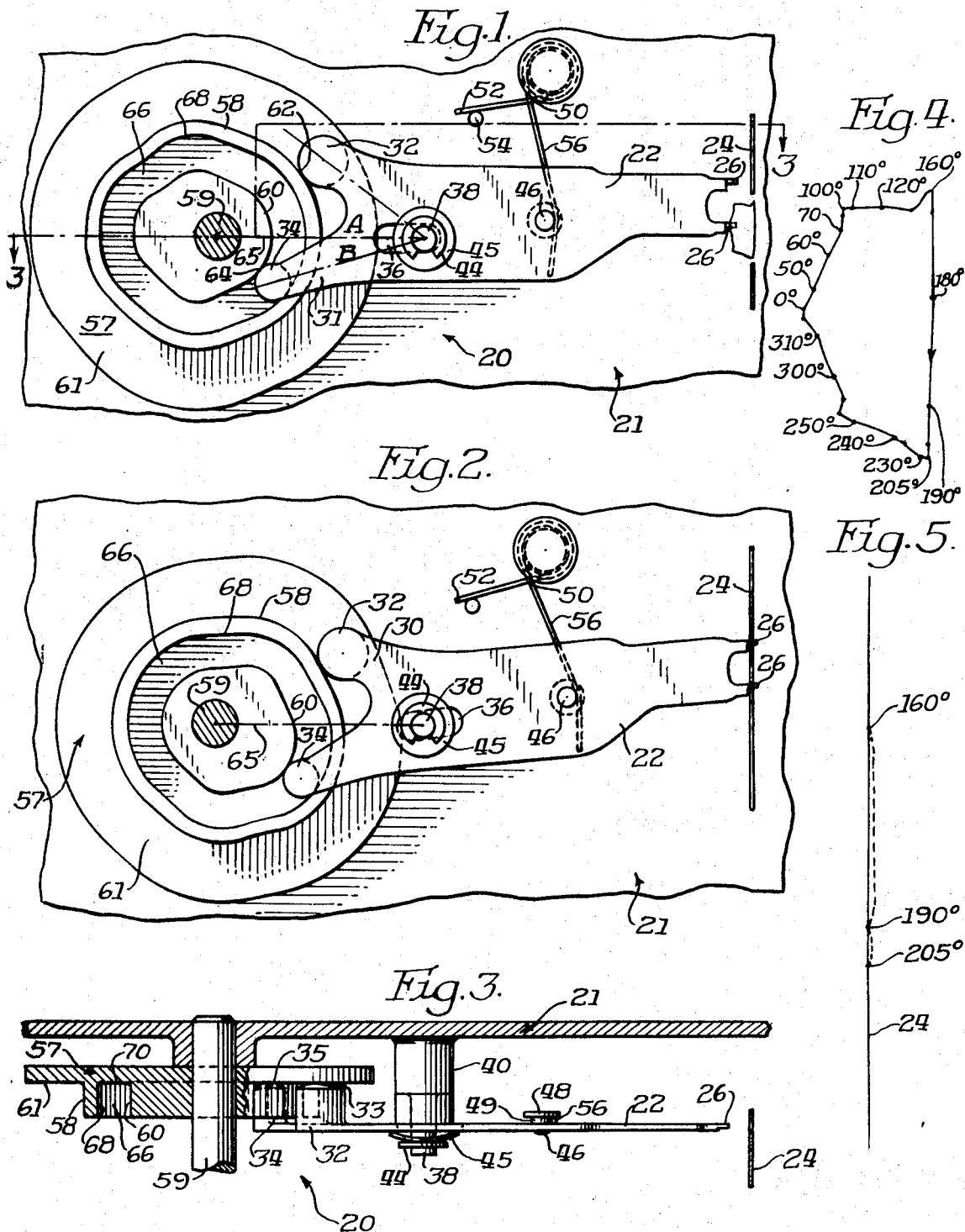
Inventors:
George F. Krtous,
Edward G. Thurston.
By William F. [signature] Atty

INTERMITTENT FILM MOTION MECHANISM

This invention relates to intermittent film motion mechanisms for use in motion picture apparatus and the like, such as projectors, and more particularly relates to an improved intermittent film motion mechanism having a novel cam and shuttle arrangement.

Various types of intermittent film motion mechanisms similar in some respects to that of the present invention have been proposed or utilized in the past. These devices, however, have not been altogether satisfactory in spite of the great amount of effort and development work. The prior art has constantly been faced with a number of problems in developing an intermittent film motion mechanism that possesses the necessary characteristics to achieve an efficient low-cost device.

The mechanisms of the prior art are usually constructed at considerable expense. They have moving parts which have surfaces that frictionally engage each other and during the life of the mechanism these surfaces are subject to wear. The wearing of these surfaces produces uneven frictional engagement which, in turn, results in the production of objectionable vibrations and noises during the operation of the mechanism and uneven, inadequately precise film positioning. Further, the individual parts of the mechanism are constructed by techniques which are unable to produce with the requisite precision duplicates of each part used in the mechanism and it is thus necessary to resort to selective and time-consuming assembly of the various parts to insure that the parts of each mechanism are in proper engagement.

The intermittent film motion mechanisms usually include a shuttle which is movable into and out of engagement with the film and up and down relative to the film. The in-and-out movement is usually imparted to the shuttle by an in-and-out cam and the up-and-down movement is imparted to the shuttle by a second cam known as a pulldown cam. To reduce the number of parts and thereby the cost and assembly time, the prior art has developed a cam which in combination with a spring controls the up-and-down and in-and-out motion imparted by the cam to a shuttle engaged with the cam. However, with these devices, if some binding of the shuttle should occur on the shuttle withdrawal stroke of the cycle, the motion of the shuttle becomes completely dependent on the spring for continuity, that is, it is no longer positive withdrawal. As used herein, the term "positive" connotes that the motion of the shuttle is definitely controlled by the cam. That is, continuity of contact between the follower portions of the shuttle and the associated cam surfaces is an inherent kinematical property of the design and is nowhere throughout a complete rotational cycle dependent on an external agency such as a spring or gravity force. Thus the shuttle must execute (to within acceptable, known and controllable tolerances) a uniquely repetitive action with subsequent rotations as it follows the cam surfaces by virtue of the characteristic mating of the two and is never dependent on an external agency. The term "nonpositive" connotes the fact that during some portion of the cam-shuttle cycle mutual contact is dependent on an external agency. Thus in a "nonpositive" design the desirable characteristic of constantly repetitive shuttle-action is periodically dependent on some such external device (e.g., a spring force) rather than being always under positive control of the cam itself. Practical considerations such as rate of frictional wear limit the force capabilities of such an external agency as a return spring. Thus under infrequent but not uncommon conditions such as "binding" due to some film irregularity, forces can be generated which exceed the capability of the external agency (e.g., return spring). Thus extreme departure from the normally repetitive action can occur which in turn usually results in serious film damage.

Accordingly, this invention provides a new and improved intermittent film motion mechanism that is self-fitting, self-wear compensating, relatively simple to assemble, uses a minimum number of parts, uses relatively low-cost parts, and requires a minimum adjustment at assembly. This invention also provides an intermittent film motion mechanism that permits positive, protected pullback on shuttle withdrawal and return and thus guards against potential film damage as described above.

Additional advantages of the invention will be set forth in part in the description which follows and in part will be obvious from the description or may be learned by practice of the invention. The advantages are realized and attained by means of the instrumentalities and combinations particularly pointed out in the appended claims.

In accordance with its purpose, as embodied and broadly described, the intermittent film motion mechanism of this invention comprises a shuttle having first and second cam followers positioned on the shuttle, a film engaging member fixed to the shuttle, a cam rotatable about an axis of rotation and engageable with the shuttle through the first and second cam followers for reciprocating the shuttle and its attached film engaging member up and down and in and out relative to the film, resilient means to continuously urge the shuttle against the cam, a pivot pin for the shuttle located between the cam followers and the film engaging member, an outer cam surface on the cam with which the first cam follower is engaged, an inner cam surface on the cam with which the second cam follower is engaged, the inner cam surface having a contour differing from the outer cam surface.

Preferably, the distance from the center of the pivot pin to the center of the first cam follower is different than the distance from the center of the pivot pin to the center of the second cam follower. It is also preferred than an angle formed by a centerline connecting the center of the pivot pin and axis of rotation of the cam and a line connecting the center of the pivot pin with the center of the first cam follower is different than an angle formed by the centerline and line connecting the center of the pivot pin and the second cam follower.

The cam preferably contains a lip which is perpendicular to the outer cam surface and extends radially outwardly from the outer cam surface and the end of the first cam follower is simultaneously engaged with the lip. It is also preferred that the cam contain a groove having inner and outer groove surfaces and that cam surface which is engaged with the second of the cam followers is the inner groove surface and the outer groove surface is an alternate cam surface for the cam follower engaged with the inner groove surface.

Desirably, the groove is located interiorly of the outer cam surface and has an inner groove surface which corresponds to the inner cam surface, and outer groove surface spaced from and parallel to the inner groove surface and an end groove surface connecting the inner and outer groove surfaces, the second cam follower normally engaging the inner groove surface and is constrained by but not fitted into the groove. It is also desirable that the outer cam surface have a line of symmetry and that the inner cam surface by asymmetrical about the line of symmetry.

It is to be understood that both the foregoing general description and the following detailed description are exemplary and explanatory but are not restrictive of the invention.

The accompanying drawings which are incorporated in and constitute a part of this specification illustrate one embodiment of the invention and together with the description serve to explain the principles of the invention.

Of the drawing:

FIG. 1 is an elevation of an intermittent film motion mechanism constructed in accordance with the principles of this invention and particularly showing the relationship of the cam with respect to the shuttle when the shuttle is disengaged from the film;

FIG. 2 is an elevation of an intermittent film motion mechanism constructed in accordance with the principles of this invention and particularly showing the arrangement of the cam and the shuttle when the claw portion of the shuttle is engaged with the film;

FIG. 3 is a horizontal section taken along line 3—3 of FIG. 1;

FIG. 4 is a plot of the motion of a lower film engaging member as determined at every 10° of rotation of the cam for a full 360° revolution of the cam; and FIG. 5 is a side view of the film and showing the excursion of that point on a lower film engaging member which just even with the film gate at the start of the pulldown interval throughout the pulldown interval.

For the purpose of clarity and simplification, only those parts of an intermittent film-feeding mechanism for a motion picture projector which are essential to an understanding of this invention have been illustrated in the drawings.

As shown in FIG. 1, the intermittent film motion mechanism, generally 20, includes a housing, generally 21, and a shuttle 22 which is perpendicular to the plane of a motion picture film 24. It will be understood, of course, that the film is threaded through the usual gate structure (not shown) positioned immediately in front of the intermittent film motion mechanism, the gate structure being omitted from the drawings for clarity. Normally, the end of the shuttle closest to the film is provided with one or, as shown in FIG. 1, two-film engaging members 26, or claws which are attached to the body of the shuttle and can intermittently engage the usual perforations along the edge of the film to feed the film through the projector. Shuttle 22 is mounted to move up and down and in and out relative to the film. Shuttle 22 will thus reciprocate up and down to effect film advance and will move in and out to move the film-engaging members 26 into and out of engagement with the perforations in the film.

In accordance with the invention, the shuttle 22 is provided with first and second cam followers 32 and 34 which are positioned on the shuttle 22. As here embodied, shuttle 22 is provided with a first cam follower 32 and a spaced second cam follower 34. The cam followers are perpendicular to the body of the shuttle 22 and are positioned on the shuttle 22 at the end opposite the film-engaging members 26. The end opposite the film engaging members 26 contains a first extension arm 30 on which first cam follower 32 is located and a second extension arm 31 on which the second cam follower 34 is located. Extension arms 30 and 31 diverge outwardly from the body of the shuttle 22 and are at an acute angle to each other so that the shuttle 22 has a substantially Y-shaped configuration. Cam followers 32 and 34 are made of a material, such as molded nylon, which can be easily manufactured and which has good wear resistance properties. The cam followers are each in the form of a cylindrical pin which has a center longitudinal axis with the pin either molded directly to shuttle 22 or otherwise suitably fixed to the shuttle 22. As best shown in FIG. 3, cam followers 32 and 34, respectively, have rounded ends 33 and 35, and the diameter of cam follower 32 is slightly larger than that of cam follower 34. Cam followers 32 and 34 each have a cylindrical surface for contacting the cam surfaces.

Shuttle 22 has an elongated slot 36 substantially perpendicular to the plane of film 24 and located between the film-engaging members 26 and the cam followers 32 and 34. A pivot pin 38 perpendicular to the body of shuttle 22 extends through the shuttle 22 and into slot 36 so that shuttle 22 is pivotable about pivot pin 38 and can move or slide on pivot pin 38 in a direction perpendicular to the plane of the film 24. Pivot pin 38 is secured to a tubular sleeve 40 which extends from housing 21 of the intermittent film motion mechanism. As best shown in FIGS. 1 and 3, pivot pin 38 has a snapring 44 mounted on its end and located between shuttle 22 and snapring 44 is a disk spring 45 which acts to positively position shuttle 22 against tubular sleeve 40.

As seen in FIGS. 1 through 3, shuttle 22 is provided with a pin 46 which has a head 48 that extends radially outwardly from the body of the pin and parallel to the body of shuttle 22 to form a recess 49. A coiled spring 50 is mounted on the housing and has a leg 52 which is engaged with a pin 54 on the housing and a leg 56 which is engaged with pin 46 to continuously urge shuttle 22 away from the film and toward engagement with a rotatable drive cam structure, generally 57, described in greater detail hereinafter. Cam structure 57 is so formed that it in combination with the spring 50 causes the film engaging members to describe a path of the type shown in FIG. 4.

In accordance with the invention, a cam structure 57 is provided which is rotatable about an axis of rotation and is engageable with the shuttle 22 through the first and second cam followers 32 and 34 for reciprocating the shuttle 22 and its attached film-engaging member 26 up and down and in and out relative to film 24. As here embodied, the cam structure is a rotatable positive motion cam structure 57 rotatable about the center longitudinal axis of and fixed to a drive means for rotating the cam structure 57 about the axis of rotation. As here illustrated, the drive means is a drive shaft 59, which extends parallel to pivot pin 38, and which can be rotated at a constant desired speed by any suitable mechanism such as a constant speed drive motor (not shown).

In accordance with the invention, cam structure 57 has an outer cam surface 58 with which the first cam follower 32 is engaged and an inner cam surface 60 with which the second cam follower 34 is engaged, the inner cam surface 60 having a curvature differing from the outer cam surface 58. The cylindrical surface of cam follower 32 is engaged with outer cam surface 58 and the cylindrical surface of cam follower 34 is normally engaged with inner cam surface 60. A lip 61 perpendicular to outer cam surface 58 and extending radially outwardly from the outer cam surface 58 is formed integral with the cam and rounded end 33 of cam follower 32 rides on the lip. Cam follower 32 contacts outer cam surface 58 at a contact line 62 and cam follower 34 contacts inner cam surface 60 at a contact line 64. Outer cam surface 58 has a line of symmetry which is coincident with a centerline 65 passing through the center of pivot pin 38 and the axis of rotation of the cam when the cam causes the shuttle to be in its 0° position from the film (FIG. 1) and inner cam surface 60 is asymmetrical about this line of symmetry.

The distance from the center of pivot pin 38 to the center of cam follower 32 is different than the distance from the center of pivot pin 38 to the center of cam follower 34. Similarly, an angle A formed by centerline 65 connecting the center of pivot pin 38 and the axis of rotation of cam structure 57 and a line connecting the center of the pivot pin with the center of cam follower 32 is different than an angle B formed by line 65 and a line connecting the center of pivot pin 38 with the center of cam follower 34. As shown in FIG. 1 which corresponds to the 0° position, the distance to the center of cam follower 32 is less than the distance to cam follower 34 and angle A is greater than angle B.

In the present preferred embodiment of this invention, the cam is provided with a groove having inner and outer groove surfaces and one of the cam surfaces engaged with one of the cam followers is the inner groove surface, and the outer groove surface is an alternate cam surface for the cam follower engaged with the inner groove surface.

As here embodied, inner cam surface 60 is the inner groove surface of a groove 66 located interiorly of outer cam surface 58. Groove 66 is also provided with an outer groove surface 68 which is spaced from and parallel to inner cam surface 60 so that it has a contour similar to that of the inner cam surface 60. An end groove surface 70 connects inner cam surface 60 to outer groove surface 68. Cam follower 34 rides within groove 66 and under normal conditions, the spring force of spring 50 causes the cylindrical surface of cam follower 34 to constantly engage inner cam surface 60 of groove 66 only, while rounded end 35 engages end groove surface 70. Cam follower 34 is constrained by but is not precision fitted into the groove 66 so that it can move a small distance to contact the outer groove surface 68 which then functions as an alternate to inner cam surface 60. As will be explained in more detail hereinafter, should a bind occur on the withdrawal of the shuttle from the film, cam follower 34 will contact the outer groove surface 68 to maintain a positive drive for the shuttle.

The operation of the intermittent film motion mechanism will now be described with particular reference to FIGS. 4 and 5.

FIG. 4 illustrates the path followed during a full 360° rotation of the cam by the point on the lower film engaging member 26 that is just coincident with the film plane at the start of the pulldown cycle. This path is realized by the angle A of approximately 35° and by an angle B of approximately 16°; by the distance from the center of the pivot pin 38 to the center of the outer cam follower 32 being approximately 0.48 inches and the distance to the center of the inner cam follower 34 from the center of pivot pin 38 being approximately 0.69 inches. The outer cam follower 32 has a diameter of approximately 0.22 inches and the inner cam follower 34 is smaller and has a diameter of approximately 0.125 inches. The height of the two cam followers is approximately 0.156 inches. As will be apparent to those skilled in the art, these dimensions can be varied to obtain the same or slightly altered paths for the shuttle and film engaging members.

In operation, the cam structure 57 is rotated by drive shaft 59 in a counterclockwise direction (as viewed in FIGS. and 2) and the cam and cam followers are so designed that both follower surfaces are in simultaneous engagement with contact lines 62 and 64 on the cam surface. Each revolution of drive shaft 59 will produce one revolution of cam structure 57, and during each revolution of cam structure 57, the cam structure will, because of its irregular contour, transmit an in-and-out reciprocating motion and an up-and-down reciprocating motion to shuttle 22 through the continuous engagement of cam followers 32 and 34 with cam surfaces 58 and 60.

Assuming that the periphery of the outer cam surface 58 is divided into a series of segments defined by the points of intersection of a set of radial lines drawn outward from the center of rotation and spaced every 10°, 0° to 360° inclusive, the 9° and 360° lines being coincident with the line of centers of the axis of rotation of the cam structure 57 and the pivot point and the line of bilateral symmetry of the outer cam surface 58 the cam structure 57 and the shuttle 22 thus being in the 0° position, it is seen that from a rotation of 0° to a rotation of 160°, the cam has a contour which, upon rotation of the cam, positively drives the cam followers 32 and 34 and the shuttle 22 against the pressure of spring 50 and causes the shuttle 22 to slide on pivot pin 38 in a direction substantially perpendicular to the plane of film 24 so that it moves away from the axis of rotation of cam 59 and inwardly toward film 24 to bring film-engaging members 26 into engagement with successive film perforations prior to the shuttle's movement of the film-engaging members 26 to their down position, that is, prior to pulldown.

After the film-engaging members 26 engage film 24, the contour of cam structure 57 is such that continued rotation of the cam pivots shuttle 22 about pivot pin 38 to positively drive the film-engaging members 26, and film 24 downwardly. The pulldown angle for cam structure 57 here illustrated, that is, the number of degrees that cam structure 57 rotates during the downward movement of film-engaging members 26 and film 24, is approximately 45° and starts from a cam rotation of approximately 160° and continues to a cam rotation approximately 205°. The maximum vertical or downward displacement of film 24 during each revolution of cam structure 57 is approximately 0.16 inches.

The pulldown path of the point on the lower film engaging member that is just coincident with the film plane is further illustrated in FIG. 5 which shows that the path is an almost perfect vertical pulldown path. The maximum horizontal deviation from a perfect vertical path is approximately 0.003 inches. As will be apparent to those skilled in the art, other pulldown angles can be designed to obtain the same or slightly altered paths for shuttle 22 and film engaging members 26.

After the cam reaches a rotation of approximately 205°, the downward movement of the shuttle is stopped, and the contour of cam structure 57 is such that continued rotation of cam structure 57 causes shuttle 22 to slide on pivot pin 38 in a direction substantially perpendicular to the plane of film 24 and toward the axis of rotation of cam structure 57 so that film-engaging members 26 are moved out of engagement with the film, perforations prior to the shuttle's upward movement. Since spring 50 continuously urges the shuttle 22 away from the film 24, it cooperates with cam structure 57 to drive shuttle 22 out of engagement with film 24 when the cam rotation reaches 205°. As can be seen from FIG. 4, shuttle 22 is driven by cam structure 57 and spring 50 substantially perpendicular to the film from a cam rotation of 205° to a cam rotation of approximately 230°.

In the past, if some binding force should act on shuttle 22 during this shuttle retraction phase of the cycle, the withdrawal of shuttle 22 from film 24 would be then completely dependent on the spring force for continuity and would, therefore, not be positive. However, the present cam construction provides positive withdrawal even though a bind should occur. If a bind occurs, the inner cam follower 34 would be constrained to move no further than the outer groove surface 68 and engage outer groove surface 68. Since outer groove surface 68 has the same curvature as the inner surface 60, the shuttle 22 will follow substantially the same path as would be imparted to it by the inner cam surface 60 so that positive motion is at all times maintainable.

After the cam structure 57 reaches a rotation of 230° the substantially perpendicular withdrawal of shuttle 22 from film 24 is stopped and the contour of cam structure 57 is such that continued rotation of cam structure 57 causes shuttle 22 to slide on pivot pin 38 and to simultaneously pivot counterclockwise about pivot pin 38 so that the shuttle's film engaging members 26 have both an upward movement and an outward movement away from film 24. This upward and outward movement continues until just before the cam returns to its 0° position.

During this upward and outward movement of the shuttle's film-engaging members 26, the spring 50 cooperates with cam 57 to drive shuttle 22 through this portion of the cycle. Previously during the shuttle retraction or withdrawal phase of the cycle, if some binding force should act on shuttle 22, the motion would be then completely dependent on the spring force for continuity and would, therefore, not be positive. However, the present cam construction would provide a positive motion during this phase of the cycle in the same manner as previously described even though a bind should occur and film damage would be avoided.

After the cam returns to its 9° position, the contour of the cam is such that continued rotation of the cam causes the shuttle's film-engaging members 26 to move upwardly, but instead of moving outwardly with respect to film 24, the film-engaging members 26 start their inward movement. This upward and inward movement continues until the cam reaches a rotation of 100° where it again begins the previously described substantially perpendicular inward drive of shuttle 22 to repeat a 360° cycle.

The use of cam 57 in combination with spring 50 to impart both the in-and-out and the up-and-down motion of shuttle 22 provides an intermittent film motion mechanism 20 that possesses the necessary characteristics to achieve an efficient low-cost mechanism. The provision of a cam and spring to provide both the in-and-out motion and up-and-down motion reduces the number of parts and thereby reduces the cost of the mechanism as well as the time necessary to assemble a complete mechanism. Further, since the cam followers on the shuttle are at the end of the extension arms, the continuous urging of the shuttle against the cam by the spring results in a mechanism that is substantially self-fitting in that the spring simultaneously urges both of the cam followers on the shuttle into proper engagement with their respective cam surfaces. This self-fitting feature means that a minimum or no adjustment is required at assembly. Also, as wear occurs during the life of the mechanism, the spring will compensate for this wear by maintaining the proper engagement of the cam followers with the cam so that a self-wear compensating mechanism is provided. The maintaining of the proper engagement insures that the mechanism will not produce excessive vibration and noise during its operational life. Further it insures precise repetition.

What is claimed is:

1. In an intermittent film motion mechanism, the combination comprising:
a shuttle having first and second cam followers positioned on the shuttle;
a film engaging member attached to the shuttle;
a cam structure rotatable about an axis of rotation and engageable with the shuttle through said first and second cam followers for reciprocating the shuttle and its attached film engaging member up and down and in and out relative to the film;
resilient means to continuously urge the shuttle against the cam;
a pivot pin for the shuttle located between the cam followers and the film engaging member;
an outer cam surface on the cam with which said first cam follower is engaged; and,
an inner cam surface on the cam with which said second cam follower is engaged, said inner cam surface having a contour differing from said outer cam surface.

2. The intermittent film motion mechanism of claim 1 wherein the distance from the center of said pivot pin to the center of the first cam follower is different than the distance from the pivot pin to the center of the second cam follower.

3. The intermittent film motion mechanism of claim 2 wherein the distance from the center of said pivot pin to the center of the first cam follower is less than the distance from the center of said pivot pin to the center of the second cam follower.

4. The intermittent film motion mechanism of claim 1 wherein an angle formed by a centerline connecting the center of the pivot pin and axis of rotation of the cam and a line connecting the center of the pivot pin with the center of the first cam follower is different than the angle formed by said centerline and a line connecting the center of the pivot pin and the second cam follower.

5. The intermittent film motion mechanism of claim 4 wherein the angle formed by said centerline and the line connecting the center of the pivot pin with the center of the first cam follower is greater than the angle formed by said centerline and the line connecting the center of the pivot pin and the second cam follower.

6. The intermittent film motion mechanism of claim 1 wherein the cam contains a lip which is perpendicular to the outer cam surface and extends radially outwardly from the outer cam surface and said first cam follower is engaged with said lip.

7. The intermittent film motion mechanism of claim 1 wherein the cam contains a groove having inner and outer groove surfaces and one of the cam surfaces engaged with one of the cam followers is the inner groove surface and the outer groove surface is an alternate cam surface for the cam follower engaged with the inner groove surface.

8. The intermittent film motion mechanism of claim 1 wherein the cam contains a groove located interiorly of the outer cam surface and having an inner groove surface which corresponds to the inner cam surface, an outer groove surface spaced from and parallel to the inner groove surface and an end groove surface connecting the inner and the outer groove surfaces, the second cam follower normally engaging the inner groove surface and being constrained by but not fitted into the groove.

9. The intermittent film motion mechanism of claim 1 wherein said cam followers are in the form of pins having different diameters with each pin having a rounded end engaged with the lip portion of the cam.

10. In an intermittent film motion mechanism, the combination comprising:
a shuttle having first and second cam followers positioned on the shuttle;
an upper and lower film engaging member attached to the shuttle;
a cam structure rotatable about an axis of rotation and engageable with the shuttle through said first and second cam followers for reciprocating the shuttle and its attached film engaging members up and down and in and out relative to the film;
resilient means to continuously urge the cam followers against the respective cam surfaces;
a pivot for the shuttle located between the cam followers and the film engaging members;
an outer cam surface on the cam engaged with said first cam follower;
a groove located interiorly of the outer cam surface and having an inner groove surface which corresponds to an inner cam surface;
an outer groove surface spaced from and parallel to the inner groove surface, the outer groove surface being an alternate inner cam surface;
an end groove surface connecting the inner and outer groove surfaces;
the second cam follower normally engaging the inner groove surface and being constrained by but not fitted in the groove;
said inner and outer groove surfaces having contours differing from the contour of the outer cam surface; and
a lip perpendicular to the outer cam surface and extending radially outwardly from the outer cam surface for engagement by the rounded end of said first cam follower.

11. The intermittent film motion mechanism of claim 10 wherein the outer cam surface has a line of bilateral symmetry, and the inner cam surface is asymmetrical about the line of symmetry.

* * * * *